US 11,478,769 B2

(12) United States Patent
Pretz

(10) Patent No.: US 11,478,769 B2
(45) Date of Patent: *Oct. 25, 2022

(54) REACTOR SYSTEMS COMPRISING FLUID RECYCLING

(71) Applicant: Dow Global Technologies LLC, Midland, MI (US)

(72) Inventor: Matthew T. Pretz, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/325,489

(22) Filed: May 20, 2021

(65) Prior Publication Data
US 2021/0268464 A1    Sep. 2, 2021

Related U.S. Application Data

(63) Continuation of application No. 16/619,628, filed as application No. PCT/US2018/037196 on Jun. 13, 2018, now Pat. No. 11,059,013.
(Continued)

(51) Int. Cl.
*B01D 47/06* (2006.01)
*B01J 8/18* (2006.01)
(Continued)

(52) U.S. Cl.
CPC ............ *B01J 8/1863* (2013.01); *B01D 47/06* (2013.01); *B01J 8/005* (2013.01); *B01J 8/1827* (2013.01);
(Continued)

(58) Field of Classification Search
CPC .... B01D 47/14; B01D 47/06; B01D 2247/04; B01D 2247/107; B01J 2208/00761;
(Continued)

(56) References Cited

U.S. PATENT DOCUMENTS 3,547,805 A    12/1970 Mitchell
4,579,716 A    4/1986 Krambeck et al.
(Continued)

FOREIGN PATENT DOCUMENTS

CN    1106131 A    8/1995
CN    104302743 A    1/2015
(Continued)

OTHER PUBLICATIONS

Office Action relating to Chinese Patent Application 201880040539.5, dated May 31, 2021.
(Continued)

*Primary Examiner* — Sharon Pregler
(74) *Attorney, Agent, or Firm* — Dinsmore & Shohl LLP

(57) ABSTRACT

A method for processing a chemical stream includes contacting a feed stream with a catalyst in an upstream reactor section of a reactor having the upstream reactor section and a downstream reactor section, passing an intermediate product stream to the downstream reactor section, and introducing a riser quench fluid into the downstream reactor section, upstream reactor section, or transition section and into contact with the intermediate product stream and the catalyst to slow or stop the reaction. The method includes separating at least a portion of the catalyst from the product stream, passing the product stream to a product processing section, cooling the product stream, and separating a portion of the riser quench fluid from the product stream. The riser quench fluid separated from the product stream may be recycled back to the downstream reactor section, upstream reactor section, or transition section as the riser quench fluid.

19 Claims, 6 Drawing Sheets

Related U.S. Application Data

(60) Provisional application No. 62/521,672, filed on Jun. 19, 2017.

(51) Int. Cl.
*B01J 8/00* (2006.01)
*B01J 8/26* (2006.01)
*C10G 11/18* (2006.01)
*B01D 47/14* (2006.01)

(52) U.S. Cl.
CPC .............. *B01J 8/1836* (2013.01); *B01J 8/26* (2013.01); *C10G 11/182* (2013.01); *C10G 11/187* (2013.01); *B01D 47/14* (2013.01); *B01J 2208/00761* (2013.01); *C10G 2300/4081* (2013.01)

(58) Field of Classification Search
CPC ........ B01J 8/005; B01J 8/1827; B01J 8/1836; B01J 8/1863; B01J 8/26; B01J 8/0055; B01J 8/006; C10G 11/182; C10G 11/187; C10G 2300/4081; C10G 11/18; C10G 2300/4006
See application file for complete search history.

(56) References Cited

U.S. PATENT DOCUMENTS

| | | | |
|---|---|---|---|
| 4,978,440 A | 12/1990 | Krambeck et al. | |
| 5,043,058 A | 8/1991 | Forgac et al. | |
| 5,087,349 A * | 2/1992 | Goelzer | C10G 11/18 208/159 |
| 5,087,427 A | 2/1992 | Quinn et al. | |
| 5,190,650 A | 3/1993 | Tammera et al. | |
| 5,254,788 A | 10/1993 | Gartside et al. | |
| 5,275,641 A | 1/1994 | Tammera et al. | |
| 6,220,093 B1 | 4/2001 | Hirosawa | |
| 6,905,591 B2 | 6/2005 | Letzsch | |
| 7,011,740 B2 | 3/2006 | Tallman et al. | |
| 7,119,241 B2 | 10/2006 | Beech, Jr. et al. | |
| 7,495,141 B2 | 2/2009 | Lumgair, Jr. et al. | |
| 7,982,798 B2 | 7/2011 | Adams | |
| 8,669,406 B2 | 3/2014 | Pretz et al. | |
| 8,791,165 B2 | 7/2014 | Randhava et al. | |
| 9,181,500 B2 | 11/2015 | Zhu et al. | |
| 9,725,382 B2 | 8/2017 | Pretz et al. | |
| 2012/0123177 A1 | 5/2012 | Pretz et al. | |

FOREIGN PATENT DOCUMENTS

| | | |
|---|---|---|
| WO | 2008076620 A1 | 6/2008 |
| WO | 2013009820 A1 | 1/2013 |
| WO | 2013126210 A1 | 8/2013 |
| WO | 2013126243 A2 | 8/2013 |
| WO | 2018169769 A1 | 9/2018 |
| WO | 2018204562 A1 | 11/2018 |

OTHER PUBLICATIONS

Search Report relating to Chinese Patent Application 201880040539.5,dated May 31, 2021.
International Search Report and Written Opinion pertaining to PCT/US2018/037196 dated May 2, 2019.
International Search Report and Written Opinion pertaining to PCT/US2014/60371 dated Jan. 8, 2015.
International Preliminary Report on Patentability pertaining to PCT/US2014/060371 dated May 17, 2016.
Froment et al., "Thermal Cracking of Propane," Kinetics and Product Distributions, in Industrial Engineering Chemistry Process Design and Development, vol. 7, No. 3 (Jul. 1968), pp. 435-447.
Extended European Search Report, dated May 11, 2022, pertaining to European Application No. 22167894.9.

* cited by examiner

REACTOR SYSTEMS COMPRISING FLUID RECYCLING

CROSS REFERENCE TO RELATED APPLICATION

This application is a continuation of U.S. patent application Ser. No. 16/619,628 filed Dec. 5, 2019, which is a National Stage Entry under 35 U.S.C. § 371 of International Patent Application No. PCT/US2018/037196, filed Jun. 13, 2018, which claims the benefit of U.S. Provisional Patent Application Ser. No. 62/521,672 filed Jun. 19, 2017, all of which are hereby incorporated by reference herein in their entirety.

BACKGROUND

Field

The present disclosure generally relates to chemical processing systems and, more particularly, to recycling processing quench fluid streams in chemical reactor systems.

Technical Background

Light olefins may be utilized as base materials to produce many types of goods and materials. For example, ethylene may be utilized to manufacture polyethylene, ethylene chloride, or ethylene oxides. Such products may be utilized in product packaging, construction, textiles, etc. Thus, there is an industry demand for light olefins, such as ethylene, propylene, and butene. Light olefins may be produced by different reaction processes depending on the given chemical feed stream, which may be a product stream from a crude oil refining operation. Many light olefins may be produced through catalytic processes, such as catalytic hydrogenation for example, in which the feed stream is contacted with a fluidized catalyst in a reactor system that facilitates conversion of the feed stream into the light olefins.

SUMMARY

Reactor systems for converting feed streams into light olefins and other products may include a reactor portion and a catalyst processing portion. The reactor portion of the reactor system may include an upstream reactor section, a downstream reactor section, and a transition section between the upstream reactor section and the downstream reactor section. The feed stream may be contacted with a catalyst at a reaction temperature in the reactor portion of the reactor system to produce an intermediate stream through one or more chemical reactions. Without some additional change to the system, such as the reduction of the temperature of the catalyst and/or intermediate product stream, reactants, intermediates, and/or products in the intermediate product stream passing through the reactor section may continue to react until a product stream is separated from the catalyst downstream of the downstream reaction section. However, continued reaction of reactants, intermediates, and/or products in the downstream reactor section may result in decreased selectivity of the reaction system and/or increased production of undesired by-products through side reactions or over-reaction of products in the presence of the catalyst.

To improve selectivity and/or reduce production of undesired by-products, a riser quench fluid may be introduced to the downstream reactor section, an upper portion of the upstream reactor section, or the transition section to cool the catalyst and intermediate product stream to a temperature sufficiently low to slow or stop the catalyzed reactions. This may prevent continued reaction of reactants in side reactions and/or over-reaction of products in the intermediate product stream as the intermediate product stream and catalyst continue to pass through the reactor portion of the reactor system.

The riser quench fluid introduced to the downstream reactor section, upstream reactor section, or transition section may subsequently combine with the intermediate product stream passing out of the reactor system. In conventional processes, the riser quench fluid may be recovered from the reactor in a recovery process. For example, this recovered riser quench fluid may be condensed, separated and treated, before being returned to the process or otherwise disposed. This treatment may take the form of steam stripping or other treatment methods to remove organic compounds and/or other contaminants. However, the removal of the riser quench fluid from the system may undesirably place additional burden on existing facility treatment systems and add capital costs. Furthermore, the riser quench fluid condensed and recovered from the product stream may contain catalyst fines having a relatively high catalytic activity as compared with other catalyst in the system. These high-activity catalyst fines may be lost from the reactor system through treatment and disposition of the condensed riser quench fluid or from continued entrainment of the catalyst fines in the product gas stream.

According to one or more embodiments, the systems and methods disclosed herein may include a product processing section operable to both cool the product stream and remove at least a portion of the riser quench fluid from the product stream. At least a portion of the riser quench fluid removed from the product stream may be passed/recycled back to the downstream reactor section, upstream reactor section, and/or the transition section as the riser quench fluid and injected into the reactor. Additionally, the system and method may include a combustion gas processing section operable to cool the combustion gases discharged from the catalyst processing portion of the reactor system. At least a portion of a combustion gas quench fluid used to cool the combustion gas in the combustion gas processing section may also be recycled back to the downstream reactor section, upstream reactor system, or transition section so that the riser quench fluid includes the combustion gas quench fluid. Passing the riser quench fluid removed from the product stream, the combustion gas quench fluid, or both, back to the reactor (i.e., the upstream reactor section, downstream reactor section, or transition section) as the riser quench fluid may reduce the amount of processing fluids directed to and treated by the treatment systems and may enable recovery and recycling of high-activity catalyst fines back to the reactor system.

According to one embodiment, a method for processing a chemical stream may include contacting a feed stream with a catalyst in an upstream reactor section of a reactor system. The reactor system may include the upstream reactor section and a downstream reactor section, and the contacting of the feed stream with the catalyst may cause a reaction which forms an intermediate product stream. The method may further include passing at least a portion of the intermediate product stream and the catalyst from the upstream reactor section to the downstream reactor section and introducing a riser quench fluid into the downstream reactor section, the upstream reactor section, or a transition section between the downstream reactor section and the upstream reactor section and into contact with the at least a portion of the intermediate product stream and the catalyst in the downstream reactor section, the upstream reactor section, or the transition section to slow or stop the reaction of the intermediate product stream with the catalyst to form a product stream. The riser quench fluid may have a temperature less than a temperature of the intermediate product stream. The method may include separating at least a portion of the catalyst from the product stream in a catalyst separation section downstream of the downstream reactor section, passing at least a portion of the product stream and the riser quench fluid to a product processing section, and cooling the at least a portion of the product stream in the product processing section. The method may further include separating at least a portion of the riser quench fluid from the product stream in the product processing section. The riser quench fluid introduced to the downstream reactor section, the upstream reactor section, or the transition section may include the at least a portion of the riser quench fluid separated from the product stream.

According to another embodiment, a method for processing a chemical stream may include contacting a feed stream with a catalyst in an upstream reactor section of a reactor system. The reactor system may include the upstream reactor section and a downstream reactor section, and the contacting of the feed stream with the catalyst may cause a reaction which forms an intermediate product stream. The method may further include passing at least a portion of the intermediate product stream and the catalyst from the upstream reactor section to the downstream reactor section and introducing a riser quench fluid into the downstream reactor section, the upstream reactor section, or a transition section between the downstream reactor section and the upstream reactor system and into contact with the at least a portion of the intermediate product stream and the catalyst in the downstream reactor section, the upstream reactor section, or the transition section to slow or stop the reaction of the intermediate product stream with the catalyst to form a product stream. The riser quench fluid may have a temperature less than a temperature of the intermediate product stream in the downstream reactor section, upstream reactor section, or transition section. The method may further include separating at least a portion of the catalyst from the product stream in a catalyst separation section downstream of the downstream reactor section, passing at least a portion of the catalyst to a catalyst processing portion of the reactor system, and processing the at least a portion of the catalyst in the catalyst processing portion. Processing the catalyst may form a combustion gas and a processed catalyst. The method may further include passing at least a portion of the processed catalyst from the catalyst processing portion back to the upstream reactor section, passing the combustion gas to a combustion gas processing section, thermally contacting the combustion gas with a combustion gas quench fluid in the combustion gas processing section to cool the combustion gas in the combustion gas processing section and separate catalyst fines from the combustion gas, and passing at least a portion of the combustion gas quench fluid to the downstream reactor section, the upstream reactor section, or the transition section. The riser quench fluid may include the at least a portion of the combustion gas quench fluid.

According to yet another embodiment, a system for processing a chemical stream may include a reactor portion of a reactor system that includes an upstream reactor section, a downstream reactor section, a transition section between the upstream reactor section and the downstream reactor section, a riser quench fluid inlet positioned to introduce a riser quench fluid to the downstream reactor section, upstream reactor section, or transition section, and a separation device operable to separate a catalyst from a product stream. The system may further include a catalyst processing portion that includes a combustor configured to receive catalyst from the separation device and a separation section downstream of the combustor and configured to separate the catalyst from a combustion gas. The system may include a product processing section comprising a product stream inlet in fluid communication with the separation device, a quench fluid inlet operable to introduce a product quench fluid to the product processing section, a processed product stream outlet operable to pass a processed product stream out of the product processing section, and a quench fluid outlet fluidly coupled to the riser quench fluid inlet. The product processing section may be operable to reduce a temperature of the product stream, separate at least a portion of the riser quench fluid from the product stream, and pass the at least a portion of the riser quench fluid out of the quench fluid outlet, wherein the riser quench fluid comprises the at least a portion of the riser quench fluid separated from the product stream in the product processing section.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
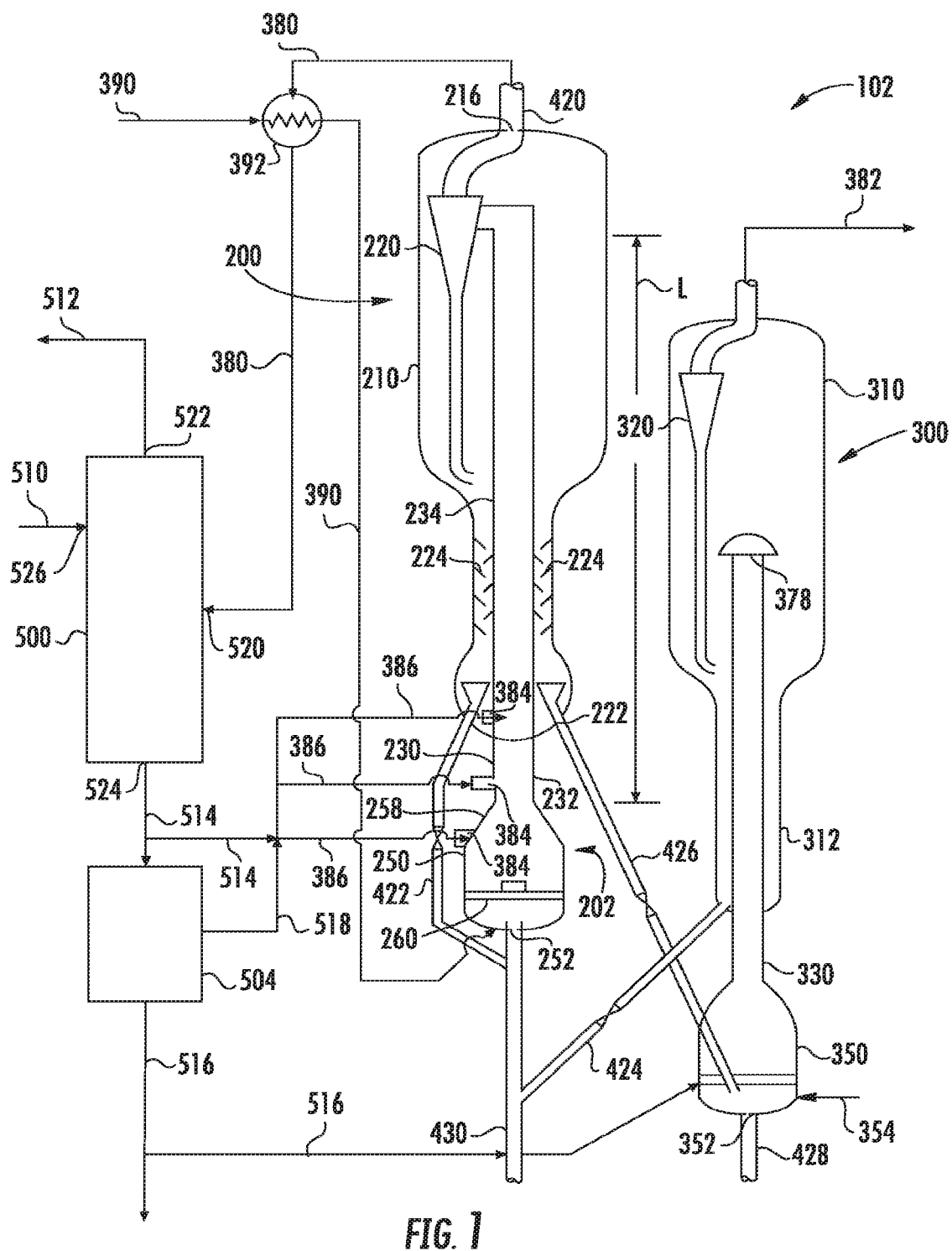
FIG. 1 schematically depicts a reactor system, according to one or more embodiments described herein.

It should be understood that the drawings are schematic in nature, and do not include some components of a reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The reactor systems and methods disclosed herein may include recycle of the riser quench fluid recovered from the product stream in a product processing section, a combustion gas quench fluid from a combustion gas processing section, or both, to the downstream reactor section, upstream reactor section, or transition section as the riser quench fluid to reduce the temperature of the intermediate product stream and catalyst. Recycling the portion of the riser quench fluid separated from the product stream in the product processing section, the combustion gas quench fluid from the combustion gas processing section, or both, as the riser quench fluid introduced to the downstream reactor section, upstream reactor section, or transition section may reduce the amount of processing fluids directed to and treated by the treatment systems and may enable recovery and recycling of high-activity catalyst fines back to the reactor system.

In non-limiting examples, the reactor systems disclosed herein may be utilized to produce light olefins from hydrocarbon feed streams. Light olefins may be produced from a variety of feed streams by utilizing different catalysts and reaction mechanisms. For example, light olefins may be produced by at least dehydrogenation reactions, cracking reactions, dehydration reactions, and methanol-to-olefin reactions. These reaction types may utilize different feed streams which are subsequently reacted to form the light olefins. While the reactor systems are described herein in the context of hydrocarbon processing to form light olefins, it should be understood that it is contemplated that the reactor systems and methods described herein may be utilized in other types of reactor systems. As such, the presently described reactor systems and methods should not be limited only to embodiments of a hydrocarbon conversion system designed to produce light olefins, such as that depicted in FIG. 1.

The reactor systems and methods for processing the chemical streams will now be discussed in detail. The chemical stream that is processed may be referred to as a feed stream, which is processed by a reaction to form a product stream. The feed stream may comprise a composition, and depending upon that feed stream composition, an appropriate catalyst may be utilized to convert the contents of the feed stream into a product stream that includes light olefins or other chemical products. For example, a feed stream may comprise at least one of propane, butane, ethane, or ethylbenzene, and the reaction system may be a dehydrogenation system in which the feed stream may be converted to light olefins through dehydrogenation in the presence of a dehydrogenation catalyst, such as a catalyst comprising platinum, palladium, and/or gallium. Other catalysts and reaction mechanisms may be utilized to form light olefins from a hydrocarbon feed stream.

Now referring to FIG. 1, an example reactor system 102 is schematically depicted. The reactor system 102 generally comprises multiple system components, such as a reactor portion 200, a catalyst processing portion 300, and a product processing section 500. As used herein in the context of FIG. 1, the reactor portion 200 generally refers to the portion of a reactor system 102 in which the major process reaction(s) takes place. For example, the reactor system 102 may be a dehydrogenation system in which the feed stream 390 is dehydrogenated in the presence of the dehydrogenation catalyst in the reactor portion 200 of the reactor system 102. The reactor portion 200 comprises a reactor 202 which may include a downstream reactor section 230 and an upstream reactor section 250. According to one or more embodiments, as depicted in FIG. 1, the reactor portion 200 may additionally include a catalyst separation section 210 which serves to separate the catalyst from the chemical products formed in the reactor 202. Also, as used herein, the catalyst processing portion 300 generally refers to the portion of a reactor system 102 in which the catalyst is in some way processed, such as by combustion. The catalyst processing portion 300 may comprise a combustor 350 and a riser 330, and may optionally comprise a catalyst separation section 310. The catalyst may be regenerated by burning off contaminants like coke and/or heating the catalyst in the catalyst processing portion 300. A supplemental fuel may be utilized to heat the catalyst in the catalyst processing portion 300 if coke or another combustible material is not formed on the catalyst, or an amount of coke formed on the catalyst is not sufficient to burn off to heat the catalyst to a desired temperature. In one or more embodiments, the catalyst separation section 210 may be in fluid communication with the combustor 350 (e.g., via standpipe 426) and the catalyst separation section 310 may be in fluid communication with the upstream reactor section 250 (e.g., via standpipe 424 and transport riser 430).

As described with respect to FIG. 1, the feed stream 390 may enter the transport riser 430 or the upstream reactor section 250, and the product stream 380 may exit the reactor system 102 via pipe 420. According to one or more embodiments, the reactor system 102 may be operated by feeding a chemical feed (e.g., in a feed stream 390) and a fluidized catalyst into the upstream reactor section 250. The chemical feed contacts the catalyst in the upstream reactor section 250 to form an intermediate stream. The intermediate stream and the catalyst each flow upwardly into and through the downstream reactor section 230. The intermediate stream and the catalyst may continue to react in the downstream reactor section 230 to produce a chemical product. The chemical product and the catalyst may be passed out of the downstream reactor section 230 to a separation device 220 in the catalyst separation section 210. The catalyst is separated from the chemical product in the separation device 220. The chemical product is transported out of the catalyst separation section 210 as the product stream 380. The separated catalyst is passed from the catalyst separation section 210 to the combustor 350. In the combustor 350, the catalyst may be processed by, for example, combustion. The catalyst may then be passed out of the combustor 350 and through the riser 330 to a riser termination separator 378, where the combustion gas and solid components from the riser 330 are at least partially separated. The combustion gases and remaining solids are transported to a secondary separation device 320 in the catalyst separation section 310 where the remaining catalyst is separated from the combustion gases 382 produced from the catalyst processing (e.g., gases emitted by combustion of spent catalyst or supplemental fuel). The separated catalyst is then passed from the catalyst separation section 310 to the upstream reactor section 250 via standpipe 424 and transport riser 430, where it is further utilized in a catalytic reaction. Thus, the catalyst, in operation, may cycle between the reactor portion 200 and the catalyst processing portion 300. In general, the processed chemical streams, including the feed streams 390 and product streams 380 may be gaseous, and the catalyst may be fluidized particulate solid.

According to one or more embodiments described herein, the reactor portion 200 may comprise an upstream reactor section 250, a transition section 258, and a downstream reactor section 230, such as a riser. The transition section 258 may connect the upstream reactor section 250 with the downstream reactor section 230. According to one or more embodiments, the upstream reactor section 250 and the downstream reactor section 230 may each have a substantially constant cross-section area, while the transition section 258 may be tapered and does not have a constant cross-sectional area. The upstream reactor section 250 may generally comprise a greater cross-sectional area than the downstream reactor section 230. In some embodiments, such as those in which the upstream reactor section 250 and the downstream reactor section 230 have similar cross-sectional shapes, the transition section 258 may be shaped as a frustum. As described herein, unless otherwise explicitly stated, the "cross-sectional area" refers to the area of the cross section of a portion of the reactor part in a plane substantially orthogonal to the direction of general flow of reactants and/or products. For example, in FIG. 1, the cross sectional area of the upstream reactor section 250, the transition section 258, and the downstream reactor section 230 is in the direction of a plane defined by the horizontal direction and the direction into the page (orthogonal to the direction of fluid motion, i.e., vertically upward in FIG. 1).

As depicted in FIG. 1, the upstream reactor section 250 may be positioned below the downstream reactor section 230. Such a configuration may be referred to as an upflow configuration in the reactor 202. The reactor 202 may also be a downflow reactor in which the upstream reactor section 250 may be position above the downstream reactor section 230. Other reactor configurations are also contemplated for the reactor portion 200 of the reactor system 102.

The upstream reactor section 250 may be connected to a transport riser 430 which, in operation, may provide processed catalyst and/or reactant chemicals in a feed stream 390 to the reactor portion 200. The processed catalyst and/or reactant chemicals may be mixed with a distributor 260 housed in the upstream reactor section 250. The catalyst entering the upstream reactor section 250 via transport riser 430 may be passed through standpipe 424 to a transport riser 430, thus arriving from the catalyst processing portion 300. In some embodiments, catalyst may come directly from the catalyst separation section 210 via standpipe 422 and into a transport riser 430, where it enters the upstream reactor section 250. The catalyst can also be fed via 422 directly to the upstream reactor section 250. This catalyst may be slightly deactivated, but may still, in some embodiments, be suitable for reaction in the upstream reactor section 250. As used herein, "deactivated" may refer to a catalyst which is contaminated with a substance such as coke, or is cooler in temperature than desired. Regeneration may remove the contaminant such as coke, raise the temperature of the catalyst, or both.

Still referring to FIG. 1, the reactor portion 200 may comprise a downstream reactor section 230 which acts to transport reactants, products, and/or catalyst from the upstream reactor section 250 to the catalyst separation section 210. According to some embodiments, the downstream reactor section 230 may include an external riser section 232 and an internal riser section 234. As used herein, an "external riser section" refers to the portion of the riser that is outside of the catalyst separation section 210, and an "internal riser section" refers to the portion of the riser that is within the catalyst separation section 210. For example, in the embodiment depicted in FIG. 1, the internal riser section 234 of the reactor portion 200 may be positioned within the catalyst separation section 210, while the external riser section 232 is positioned outside of the catalyst separation section 210. Additional aspects of the reactor portion 200 of the reactor system 102 may be found in co-pending U.S. Provisional Patent Application Ser. No. 62/502,094, filed on May 5, 2017, which is incorporated by reference herein in its entirety.

As previously discussed, the intermediate product stream may continue to react in the presence of the catalyst in the downstream reactor section 230 until the catalyst is separated from the intermediate product stream in the catalyst separation section 210. Continued reaction of the intermediate product stream may result in over-reaction of products formed by the reaction into other chemical by-products or may result in continued side reactions, which may reduce selectivity of the reactor system to the desired products and/or increase the production of undesired by-products.

Referring to FIG. 1, the downstream reactor section 230 may include a riser quench fluid inlet 384 positioned to introduce a riser quench fluid 386 to the reactor 202 (i.e., upstream reactor section 250, downstream reactor section 130, and transition section 258). The riser quench fluid inlet 384 may be fluidly coupled to one or more cooling nozzles (not shown) for distributing the riser quench fluid 386 across the cross-sectional area of the reactor 202. The riser quench fluid 386 may be introduced to the reactor 202 and into contact with the intermediate product stream and the catalyst in the reactor 202. The riser quench fluid 386 may have a temperature less than a temperature of the intermediate product stream and catalyst in the reactor 202. Contacting the riser quench fluid 386 with the intermediate product stream and the catalyst may slow or stop the reaction of the intermediate product stream with the catalyst to form a product stream. The product stream and the catalyst may then pass through the remaining portions of the reactor 202 and be separated from the catalyst in the catalyst separation section 210. The product stream may include the product chemicals produced by the reaction as well as the riser quench fluid 386, which may be vaporized upon introducing the riser quench fluid 386 to the reactor 202. It is understood that the product stream 380 may also include unreacted materials from the feed stream, intermediate species formed in the reactor, by-products formed from side reactions or over-conversion of the product chemicals, other species, or combinations of these.

The riser quench fluid inlet 384 may be disposed at any position along the length L of the downstream reactor system 230. For example, in some embodiments, the riser quench fluid inlet 384 may be positioned at the external riser section 232 of the downstream reactor section 230 to introduce the riser quench fluid 386 to the external riser section 232. Alternatively, the riser quench fluid inlet 384 may be positioned at any position along the internal riser section 234 of the downstream reactor section 230 to introduce the riser quench fluid 386 to the internal riser section 234. In alternative embodiments, the riser quench fluid inlet 384 may be positioned in an upper portion of the upstream reactor section 250 or in the transition section 258 between the upstream reactor section 250 and the downstream reactor section 230. In some embodiments, the reactor 202 may include more than one riser quench fluid inlet 384, and each of the riser quench fluid inlets 384 may be positioned in one of the downstream reactor section 130, the upper portion of the upstream reactor section 250, or the transition section 258.

Thus, the riser quench fluid 386 may be introduced to the intermediate product stream and the catalyst at any point between the upper portion of the upstream reactor section 250 and the end of the downstream reactor section 230 before the catalyst separation section 210. The positioning of the riser quench fluid inlet 384 may influence the progress of the reaction in the reactor 202 and, thus, may influence the conversion of the feed materials into the products. The riser quench fluid 386 may be a liquid or a gas. For example, the riser quench fluid 386 may include steam, liquid water, liquid hydrocarbon (e.g., a quench oil, fuel oil, or other hydrocarbon), or combinations of these. The liquid hydrocarbon may include hydrocarbons having greater than or equal to 6 carbon atoms, such as from 6 carbon atoms to 25 carbon atoms, or from 6 carbon atoms to 20 carbon atoms. In some embodiments, the riser quench fluid 386 may include water. Alternatively, in other embodiments, the riser quench fluid 386 may include liquid hydrocarbon, such as quench oil or fuel oil for example. In still other embodiments, the riser quench fluid 386 may include one or more than one of benzene, toluene, pyrolysis gas, or combinations of these. In some embodiments, the riser quench fluid 386 may also include particulate solids, such as catalyst particles for example. The presence of catalyst particles in the riser quench fluid 386 will be discussed in subsequent sections of this disclosure.

The temperature of the riser quench fluid 386 may be less than the temperature of the intermediate stream and catalyst in the reactor 202 (i.e., the upstream reactor section 250, downstream reactor section 230, and transition section 258) by greater than or equal to 100° C., greater than or equal to 200° C., greater than or equal to 300° C., greater than or equal to 400° C., or greater than or equal to 550° C.

Introduction of the riser quench fluid 386 to the reactor 202 may decrease the temperature of the intermediate product stream and catalyst in the reactor 202. The decrease in the temperature of the intermediate product stream and the catalyst in the reactor 202 caused by introducing the riser quench fluid 386 may be sufficient to slow or stop the reactions of the intermediate product stream. For example, in some embodiments, the riser quench fluid 386 may reduce the temperature of the intermediate product stream and the catalyst by greater than or equal to 5° C., greater than or equal to 7° C., greater than or equal to at least 9° C., greater than or equal to 11° C., greater than or equal to 13° C., greater than or equal to 15° C., or greater than or equal to 20° C. Introduction of the riser quench fluid 386 to the reactor 202 may result in increased selectivity of the reaction in favor of selected products and may reduce formation of undesired by-products. Further examples of introducing a riser quench fluid 386 to a reactor system are disclosed in co-pending U.S. patent application Ser. No. 15/034,637, which is incorporated by reference herein in its entirety.

Referring to FIG. 1, in operation, introduction of the riser quench fluid 386 to the reactor 202 may stop or slow the reaction of the intermediate product stream to form the product stream. The product stream and the catalyst may move upward through the remaining portion of the reactor 202 (i.e., the portion downstream of the riser quench fluid inlet 384), and into the separation device 220. The separated vapors of the product stream 380 may be removed from the reactor system 102 via a pipe 420 at a gas outlet port 216 of the catalyst separation section 210. According to one or more embodiments, the separation device 220 may be a cyclonic separation system, which may include two or more stages of cyclonic separation. In embodiments where the separation device 220 comprises more than one cyclonic separation stage, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), LD2 (commercially available from Stone and Webster), and RS2 (commercially available from Stone and Webster). Primary cyclones are described, for example, in U.S. Pat. Nos. 4,579,716; 5,190,650; and 5,275,641, which are each incorporated by reference in their entirety herein.

According to some embodiments, following separation from vapors in the separation device 220, the catalyst may generally move through the stripper 224 to the reactor catalyst outlet port 222 where the catalyst is transferred out of the reactor portion 200 via standpipe 426 and into the catalyst processing portion 300. Optionally, the catalyst may also be transferred directly back into the upstream reactor section 250 via standpipe 422. Alternatively, the catalyst may be premixed with processed catalyst in the transport riser 430.

As is described in detail in accordance with the embodiment of FIG. 1, according to one or more embodiments, the catalyst may be processed by one or more of the steps of passing the catalyst from the reactor 202 to the combustor 350, burning a supplemental fuel source or coke deposited on the deactivated catalyst in the combustor 350, and passing the heated catalyst from the combustor 350 to the reactor 202.

Referring now to the catalyst processing portion 300, as depicted in FIG. 1, the combustor 350 of the catalyst processing portion 300 may include one or more lower reactor portion inlet ports 352 and may be in fluid communication with the riser 330. The combustor 350 may be in fluid communication with the catalyst separation section 210 via standpipe 426, which may supply spent catalyst from the reactor portion 200 to the catalyst processing portion 300 for regeneration. The combustor 350 may include an additional lower reactor section inlet port 352 where air inlet 428 connects to the combustor 350. The combustor 350 may also include a supplemental fuel inlet 354 for introducing a supplemental fuel to the combustor 350. The air inlet 428 may supply reactive gases which may react with the spent catalyst or a supplemental fuel from the supplemental fuel inlet 354 to at least partially regenerate the catalyst. Additional details of the catalyst processing portion may also be found in U.S. Provisional Patent Application Ser. No. 62/502,094 previously incorporated by reference.

Referring to FIG. 1, the product stream 380 may be passed from the catalyst separation section 210 of the reactor portion 200 to a product processing section 500 positioned downstream of the catalyst separation section 210. The product stream 380 may, optionally, be passed through a feed stream preheater 392 disposed downstream of the catalyst separation section 210 of the reactor portion 200 and upstream of the product processing section 500. The feed stream preheater 392 may be a heat exchanger operable to heat the feed stream 390 through heat transfer from the product stream 380 to the feed stream 390. Thus, the feed stream preheater 392 may reduce the temperature of the product stream 380 exiting the feed stream preheater 392 compared to the product stream 380 upstream of the feed stream preheater 392.

Positioned downstream of the feed stream preheater 392, the product processing section 500 may be operable to further reduce the temperature of the product stream 380. The product processing section 500 may also be operable to remove at least a portion of the riser quench fluid 386 from the product stream 380. Additionally, the product processing section 500 may be operable to remove catalyst fines and other particulate solids from the product stream 380 that were not separated from the product stream 380 in the catalyst separation section 210. A product quench fluid 510 may be introduced to the product processing section 500 to provide cooling to the product stream 380, remove at least a portion of the riser quench fluid from the product stream 380, and/or remove entrained particulate solids (e.g., catalyst fines) from the product stream 380.

The product quench fluid 510 may include steam, liquid water, liquid hydrocarbon (e.g., a quench oil, fuel oil, or other hydrocarbon), or combinations of these. The liquid hydrocarbon may include hydrocarbons having greater than or equal to 6 carbon atoms, such as from 6 carbon atoms to 25 carbon atoms, or from 6 carbon atoms to 20 carbon atoms. In some embodiments, the product quench fluid 510 may include water. Alternatively, in other embodiments, the product quench fluid 510 may include liquid hydrocarbon, such as quench oil or fuel oil for example. In still other embodiments, the product quench fluid 510 may include one or more than one of benzene, toluene, pyrolysis gas, or combinations of these. In some embodiments, the product quench fluid 510 may be the same as the riser quench fluid 386.

Referring to FIG. 1, stream 514 may be passed out of the product processing section 500 and passed back to the riser quench fluid inlet 384 so that the riser quench fluid 386 introduced to the reactor 202 (i.e., the downstream reactor section 230, the upstream reactor section 250, or the transition section 258) includes at least a portion of stream 514. Stream 514 may be a liquid and may include the portion of the riser quench fluid 386 recovered from the product stream 380. Additionally, stream 514 may include particulate solids, such as catalyst fines for example, recovered from the product stream 380. In some embodiments, stream 514 may also include at least a portion of the product quench fluid 510 introduced to the product processing section 500. As previously described, the riser quench fluid 386 introduced to the downstream reactor section 230 or other part of the reactor 202 may vaporize when contacted with the intermediate product stream and the catalyst in the reactor 202. The vaporized riser quench fluid 386 may pass through the catalyst separation section 210 with the product stream 380. In the product processing section 500, at least a portion of the vaporized riser quench fluid 386 may be condensed and separated from the product stream 380 in the product processing section 500 and may be passed out of the product processing section 500 in stream 514.

Passing stream 514 from the product processing section 500 back to the reactor 202 as the riser quench fluid 386 may reduce the quantity of stream 514 that, in some embodiments, must be treated before reuse or disposition of stream 514. Passing stream 514 back to the reactor 202 as the riser quench fluid 386 may also improve the conversion and selectivity of the reactor system 102 by returning catalyst fines to the reactor system 102.

Still referring to FIG. 1, the product processing section 500 may include a product stream inlet 520 in fluid communication with the gas outlet port 216 of the catalyst separation section 210. The product inlet stream 520 may be in fluid communication with the separation device 220 through the gas outlet port 216. In some embodiments, the optional feed stream preheater 392 may be disposed between the catalyst separation section 210 and the product processing section 500 such that fluid communication between the gas outlet port 216 and the product stream inlet 520 of the product processing section 500 may include fluid communication through the feed stream preheater 392. The product processing section 500 may also include a processed product stream outlet 522 and a quench fluid outlet 524. The processed product stream outlet 522 may be operable to pass a processed product stream 512 out of the product processing section 500. In some embodiments, the processed product stream outlet 522 may be fluidly coupled to downstream processing systems for further processing the processed product stream 512. The quench fluid outlet 524 may be fluidly coupled to the riser quench fluid inlet 384 of the to pass stream 514 back to the reactor system 202 as at least a portion of the riser quench fluid 386. For example, the quench fluid inlet 384 may be positioned in the downstream reactor section 230, the upper portion of the upstream reactor section 250, or in the transition section 258 between the upstream reactor section 250 and the downstream reactor section 230 so that the stream 514 may be passed back to the downstream reactor section 230, upstream reactor section 250, or transition section 258, respectively, as a portion of the riser quench fluid 386. The product processing section 500 may also include a quench fluid inlet 526 operable to introduce the product quench fluid 510 to the product processing section 500.

As previously discussed, the product processing section 500 may be operable to reduce a temperature of the product stream 380. A temperature of the processed product stream 512 passed out of the product processing section 500 may be less than the temperature of the product stream 380 introduced to the product processing section 500. For example, in some embodiments, the difference between the temperature of the product stream 380 introduced to the product processing section 500 and the temperature of the processed product stream 512 passed out of the product processing section may be from 50° C. to 500° C., from 50° C. to 400° C., from 50° C. to 300° C., from 50° C. to 200° C., from 100° C. to 500° C., from 100° C. to 400° C., from 100° C. to 300° C., or from 100° C. to 200° C.

The product processing section 500 may be operable to separate at least a portion of the riser quench fluid 386 from the product stream 380. Thus, the weight percent of riser quench fluid 386 in the product stream 380 introduced to the product processing section 500 through the product stream inlet 520 may be greater than the weight percent of riser quench fluid 386 remaining in the processed product stream 512 passed out of the product processing section through the processed product stream outlet 522. For example, in some embodiments, the product stream 380 introduced to the product processing section 500 may include greater than or equal to 5 wt. % riser quench fluid 386 based on the total weight of the product stream 380. After processing the product stream 380 in the product processing section 500, the processed product stream 512 passed out of the product processing section 500 through the processed product stream outlet 522 may comprise less than 5 wt. % riser quench fluid 386. The product processing section 500 may be further operable to pass at least a portion of the riser quench fluid 386 separated from the product stream 380 out of the quench fluid outlet 524 as stream 514.

As previously discussed, the product processing section 500 may be operable to remove particulate solids, including catalyst fines from the product stream 380. In some embodiments, the processed product stream 512 may be substantially free of particulate solids, such as catalyst fines. As used herein, "substantially free" of a constituent refers to a composition, stream, reaction zone, vessel, reactor, catalyst, or other structure having less than 0.1 wt. % of the constituent based on the mass flow rate of the composition, stream, zone, reactor, catalyst, or other structure. For example, the processed product stream 512 that is substantially free of particulate solids may have less than 0.1 wt. % particulate solids based on the total mass flow rate of the processed product stream 512.

Referring to FIG. 1, stream 514 may be passed from the product processing section 500 to the riser quench fluid inlet 384 as the riser quench fluid 386 and introduced to the reactor 202 to cool the intermediate product stream and catalyst in the reactor 202. Passing stream 514 to the riser quench fluid inlet 384 to introduce stream 514 into the reactor 202 as the riser quench fluid 386 may reduce the amount of fluids conveyed to downstream processing and/or treatment systems, such as water treatment systems in the case of water as the quench fluid or downstream chemical processing systems in the case of hydrocarbon-based quench fluids. Additionally, catalyst fines transferred from the product stream 380 to stream 514 in the product processing section 500 may be reintroduced to the reactor system 102 by passing stream 514 to the reactor 202 as the riser quench fluid 386.

Figure 6:
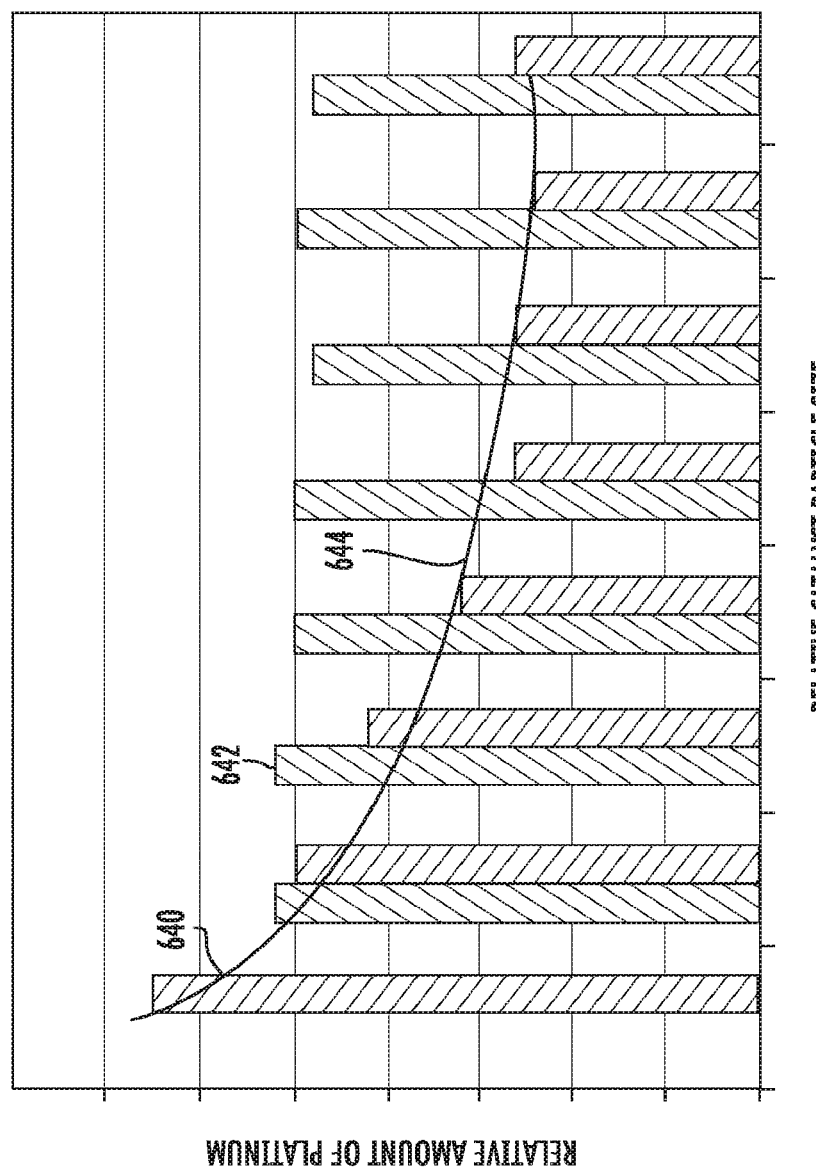
FIG. 6 schematically depicts a graph of platinum content as a function of particle size for a hydrogenation catalyst, according to one or more embodiments described herein.

It has been discovered that catalyst fines having particle-sizes smaller than the average particle-size of the catalyst in the reaction system 102 may contain a greater amount of a catalytically active material (e.g., platinum, palladium, gallium, etc.) per weight of catalyst than the larger particle-size catalyst. Referring to FIG. 6, the relative amount of platinum in a hydrogenation catalyst is shown as a function of the particle size of the catalyst for a used catalyst 640 and a new catalyst 642. As illustrated in FIG. 6, for the used catalyst 640, the relative amount of platinum may be greatest for the smallest sized catalyst particles and may decrease with increasing average particle size of the catalyst. Trend line 644 further graphically illustrates the decreasing relative amount of platinum with increasing average particle size for the used catalyst. For the new catalyst 642, the relative amount of platinum in the catalyst is generally constant with respect to particle size. The increased relative amount of platinum in the used catalyst 640 having smaller average particle size has been shown to result in improved conversion of the feed stream 153 compared to the used catalyst 640 having larger average particle size.

The catalyst particles recovered from the product stream 380 in the product processing section 500 may be catalyst fines having a smaller average particle size compared to the average particle-size of the catalyst in the reactor system 102 and may, therefore, be expected to have a greater amount of catalytically active material (e.g., platinum, palladium, gallium, etc.) compared to the average catalyst particles in the reaction system. The catalyst particles recovered from the product stream 380 may be passed back to the reactor system 102 to enhance the reaction of the feed stream 153 with the catalyst to produce the product stream 155. In particular, returning the recovered catalyst particles from the product processing section 500 to the reaction system 102 may improve the conversion and/or the selectivity of the reaction system 102.

Referring back to FIG. 1, in some embodiments, the reactor system 102 may include a product-side solids concentrator 504 disposed downstream of the product processing section 500. Stream 514 may be passed from the product processing section 500 to a product-side solids concentrator 504. The product-side solids concentrator 504 may separate catalyst particles, such as catalyst fines, from stream 514 downstream of the product processing section 500 to produce catalyst fines 516 and stream 518. Stream 518 may include a portion of the riser quench fluid separated from the product stream 380 as well as a portion of the product quench fluid introduced to the product processing section 500. Stream 518 may be substantially free of catalyst particles upon passing out of the product-side solids concentrator 504. For example, stream 518 may have less than 0.1 wt. % catalyst particles based on the total weight of stream 518. The product-side solids concentrator 504 may include at least one of a liquid candle filter, a bag filter, a filter press, other solids concentrator, or combinations of these. In some embodiments, the product-side solids concentrator 504 may include at least one liquid candle filter.

Stream 518 may be passed from the product-side solids concentrator 504 to the riser quench fluid inlet 384 as a portion of the riser quench fluid 386 to quench the intermediate product stream and the catalyst in the reactor 202 (i.e., the downstream reactor section 230, upstream reactor section 250, and/or the transition section 258). The catalyst fines 516 may be passed from the product-side solids concentrator 504 back to the reactor system 102. For example, the catalyst fines 516 may be passed to the catalyst processing portion 300 or the upstream reactor section 250 of the reactor system 102. In some embodiments, the catalyst fines 516 may be passed to the combustor 350 or section 312 of the catalyst processing portion 300, where the catalyst fines 516 may be processed in catalyst processing portion 300 before being passed back to the upstream reactor section 250. The catalyst fines 516 may include catalyst fines having a smaller average particle size relative to the average particle size of the catalyst in the reactor system 102. As previously discussed, recovering the catalyst fines 516 from stream 514 and passing the catalyst fines 516 back into the reactor system 102 may improve the conversion and selectivity of the reactor system 102 due to the additional catalyst loading on the catalyst fines 516.

Figure 2:
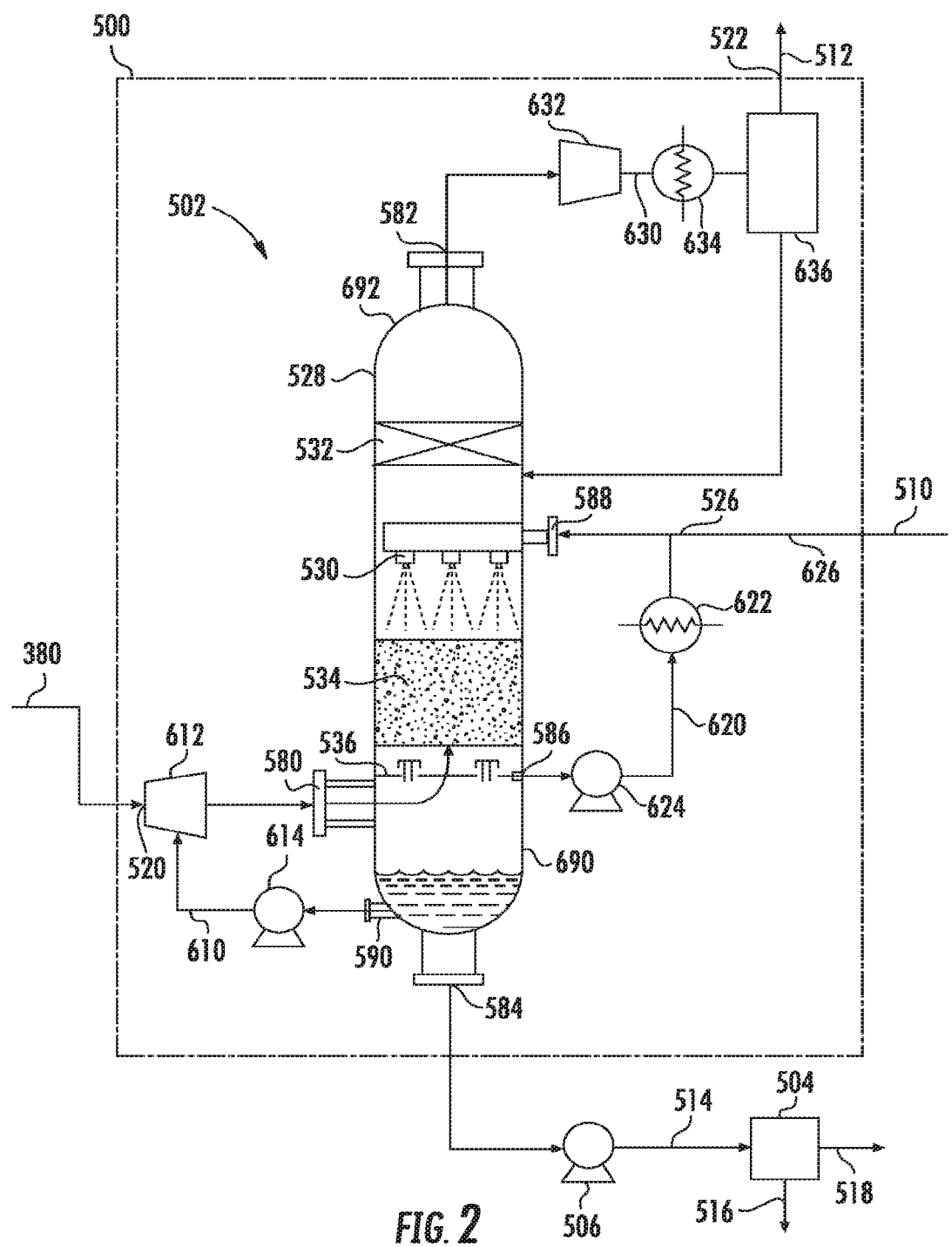
FIG. 2 schematically depicts a quench tower of the reactor system of FIG. 1, according to one or more embodiments described herein.

Referring now to FIG. 2, in some embodiments, the product processing section 500 may include a quench tower system 502. Referring to FIG. 2, the quench tower system 502 may include a quench tower 528 having a product inlet 580, a gas outlet 582, a liquid outlet 584, a quench fluid recycle outlet 586, and a quench fluid recycle inlet 588. The quench tower 528 may also include outlet 590 positioned a lower portion 690 of the quench tower 502. The product inlet 580 may be positioned in the lower portion 690 of the quench tower 502 so that gaseous portions of the product stream 380 may enter the lower portion 690 of the quench tower 528 and flow upward through the quench tower 528 to the gas outlet 582 disposed in a top of the quench tower 528. The quench fluid recycle inlet 588 may be positioned in an upper portion 692 of the quench tower 528 so that the product quench fluid 510 introduced to the quench tower 528 flows generally downward through the quench tower 528. The liquid outlet 584 may be positioned in the bottom of the quench tower 528. In this configuration, the flow of the product stream 380 upward through the quench tower 528 may be countercurrent to the flow of product quench fluid 510 downward through the quench tower 528. In some embodiments, the liquid outlet 584 may be the quench fluid outlet 524 of the product processing section 500.

The quench tower 528 may further include a plurality of nozzles 530 fluidly coupled to the quench fluid recycle inlet 588. A conduit may fluidly couple the nozzles 530 to the quench fluid recycle inlet 588. The nozzles 530 may be oriented in the quench tower 528 to distribute the product quench fluid 510 downward and across at least a portion of the cross-sectional area of the quench tower 528. In some embodiments, the nozzles 530 may be positioned to distribute the product quench fluid 510 across the entire cross-sectional area of the quench tower 528. The nozzles 530 may be positioned in the top portion 692 of the quench tower 528 to maximize the volume of the quench tower 528 for contacting the product quench fluid 510 with the product stream 380.

In some embodiments, the quench tower 528 may include a demister 532 positioned downstream of the nozzles 530. When referring to the quench tower 528, the term "downstream" is relative to the direction of flow of the product stream 380 through the vessel 528. In the embodiment shown in FIG. 2, the flow of product stream 380 through the quench tower 528 is upward, and positioning the demister 532 downstream of the nozzles 530 places the demister 532 above the nozzles 530, between the nozzles 530 and the gas outlet 582. The demister 532 may capture droplets of the product quench fluid 510 entrained in the product stream 380 through contact between the product stream 380 and the product quench fluid 510. The droplets of product quench fluid 510 captured by the demister 532 may include solid catalyst particles. The droplets of the product quench fluid 510 captured by the demister 532 may flow by gravity from the demister 532 downward through the quench tower 528 to combine with stream 514 in the lower portion 690 of the quench tower 528.

Referring to FIG. 2, in some embodiments, the quench tower 528 may include a chimney tray 536 disposed in the lower portion 690 of the quench tower 528 between the product inlet 580 and the nozzles 530. The chimney tray 536 may be operable to accumulate a volume of quench fluid flowing downward through the quench tower 528. The quench fluid accumulated in the chimney tray 536 may include the product quench liquid 510 introduced to the quench tower 528 at the quench fluid recycle inlet 588 and/or riser quench fluid 386 separated from the product stream 380 in the product processing section 500. The quench fluids accumulated in the chimney tray 536 may also include catalyst particles, such as catalyst fines, or other particulate solids. Quench fluid accumulated in excess of the fixed volume of the chimney tray 536 may overflow through the chimneys into the bottom of the quench tower 528.

As shown in FIG. 2, the quench tower 528 may optionally include a gas/liquid contactor 534 positioned between the nozzles 530 and the chimney tray 536. The gas/liquid contactor 534 may provide increased contact area between the gas phase of the product stream 380 and the liquid phase of the quench fluid 510. The increased contact area between the product stream 380 and the product quench fluid 510 may improve the efficiency of heat transfer from the product stream 380 to the product quench fluid 510 and may improve the mass transfer of the catalyst fines from the product stream 380 to the product quench fluid 510. The gas/liquid contactor 534 may include packing or trays, such as any commercially available packing or trays suitable for gas/liquid contacting. Examples of packing may include, but are not limited to, spheres, rings, structured packing, other packing, or combinations of these.

The quench tower system 502 may include a Venturi loop 610 that includes a Venturi contactor 612 disposed upstream of the product inlet 580 and a contactor pump 614 in fluid communication with the lower portion 690 of the quench tower 528. In some embodiments, the product stream inlet to the Venturi contactor 612 may be the product stream inlet 520 of the product processing section 500. The contactor pump 614 may be operable to pump liquid phase quench fluids (i.e., riser quench fluid 386, product quench fluid 510, or combinations thereof) accumulated in the lower portion 690 of the quench tower 528 to the Venturi contactor 612. The Venturi contactor 612 may be operable to contact and mix the gaseous product stream 380 with liquid phase quench fluid drawn from the lower portion 690 of the quench tower 528. Contact and mixing of the product stream 380 with the quench fluid in the liquid contactor 612 may transfer particulate solids from the gaseous phase of the product stream 380 to the liquid phase of the quench fluid.

Contacting and mixing the product stream 380 with the quench fluid from the lower portion 690 of the quench tower 528 may also reduce a temperature of the product stream 380. In some embodiments, the quench fluid introduced to the Venturi contactor 612 may have a temperature that is 50° C. to 400° C. less than a temperature of the product stream 380 introduced to the Venturi contactor 612. In some embodiments, the quench fluid temperature introduced to the Venturi contactor 612 may be less than the temperature of the product stream 380 introduced to the Venturi contactor 612 by from 50° C. to 300° C., from 50° C. to 200° C., from 50° C. to 150° C., from 75° C. to 500° C., from 75° C. to 300° C., from 75° C. to 200° C., or from 75° C. to 150° C. The Venturi contactor 612 may be fluidly coupled to the product inlet 580 of the quench tower 528 to introduce the mixture of the product stream 380 and the quench fluid to the quench tower 528.

Referring to FIG. 2, the quench tower 528 may include a quench fluid recycle loop 620 that includes a quench fluid heat exchanger 622 and a quench fluid recycle pump 624. The inlet end of the quench fluid recycle loop 620 may be fluidly coupled to the quench fluid recycle outlet 586 of the quench tower 528, and the outlet end of the quench fluid recycle loop 620 may be fluidly coupled to the quench fluid recycle inlet 588. The quench fluid recycle loop 620 may also be in fluid communication with a product quench fluid supply line 626 to provide fresh make-up product quench fluid 510 to the quench tower system 502. In some embodiments, the junction of the product quench fluid supply line 626 with the quench fluid recycle loop 620 may effectively be the quench fluid inlet 526 of the product processing section 500.

In operation, the quench fluid recycle pump 624 draws quench fluid (i.e., a mixture of riser quench fluid 386 separated from product stream 380 and the product quench fluid 510) from the quench fluid accumulated in the chimney tray 536 of the quench tower 528. The quench fluid recycle pump 624 circulates the quench fluid through the quench fluid heat exchanger 622, which may be operable to remove heat from the quench fluid. The quench fluid is then passed through the quench fluid recycle inlet 588 of the quench tower 528. The quench fluid then passes through the nozzles 530 and into the quench tower 528. The quench fluid flows downward through the quench tower 528 and into contact with the gaseous product stream 380, which is flowing upward through the quench tower 528. The quench fluid recycle loop 620 may be operable to cool the product stream 380 passing through the quench tower 528. The quench fluid recycle loop 620 may also be operable to further separate particulate solids from the product stream 380.

The quench tower system 502 may also include a product gas processing loop 630 comprising a compressor 632, a product gas heat exchanger 634 downstream of the compressor 632, and a knock-out vessel 636 downstream of the product stream heat exchanger 634. The gas processing loop 630 may be fluidly coupled to the gas outlet 582 of the quench tower 528. The gas processing loop 630 may be operable to separate the riser quench fluid 386, the product quench fluid 510, or a combination of these from the product stream 380 to produce the processed product stream 512 passed out of the product processing section 500. Quench fluids (i.e., riser quench fluids 386, product quench fluids 510, or both) may be passed from the knock-out vessel 636 back to the quench tower 528. In some embodiments, the gas outlet of the knock-out vessel 636 may be the processed product stream outlet 522 of the product processing section 500.

Referring to FIG. 2, in operation of the quench tower system 502, the product stream 380 may be passed from the catalyst separation section 210 (FIG. 1), through the optional product stream heat exchanger 392 (FIG. 1), and into the Venturi contactor 612 of the Venturi loop 610. In the Venturi contactor 612, the product stream 380 may be contacted and mixed with quench fluid to reduce the temperature of the product stream 380 and transfer particulate solids, such as catalyst particles, from the product stream 380 into the liquid phase of the quench fluid. The mixture of the product stream 380 and quench fluid may be passed to the quench tower 528 through the product inlet 580. The gaseous product stream 380 may flow upward through the quench tower 528. Simultaneously, the liquid phase quench fluid (i.e., including the riser quench fluid 386, product quench fluid 510, or both) may be introduced to the quench tower 528 through the quench fluid recycle inlet 588 positioned in the upper portion 692 of the quench tower 528. The nozzles 530 may distribute the product quench fluid 510 across the cross-sectional area of the quench tower 528. The quench fluid may flow downward through the quench tower 528. The liquid phase quench fluid may contact the gaseous product stream 380 flowing upward through the quench tower 528. The temperature of the quench fluid may be less than the temperature of the product stream 380 so that heat may transfer from the product stream 380 to the quench fluid. Contact of the product stream 380 with the quench fluid in the quench tower 528 may further transfer particulate solids from the gas phase of the product stream 380 to the liquid phase of the quench fluid.

After thermally contacting and/or physically contacting the product stream 380 with the product quench fluid 510, the product stream 380 may be passed through the demister 532 to remove any entrained liquid droplets or solid particles remaining in the product stream 380. The product stream 380 may be passed from the quench tower 528 to the gas processing loop 630. The gas processing loop 630 may separate riser quench fluid 386, product quench fluid 510, or both from the product stream 380 to produce the processed product stream 512. The riser quench fluid 386 and/or product quench fluid 510 separated from the product stream 380 may be recycled back to the quench tower 528 or the quench fluid recycle loop 620 to be combined with the product quench fluid 510.

Thermally and/or physically contacting the product quench fluid 510 with the product stream 380 in the quench tower 528 may produce stream 514. Stream 514 may include at least one of the product quench fluid 510 introduced to the product quench tower 502, catalyst fines and other particulates recovered from the product stream 380, riser quench fluid 386 separated from the product stream 380, other compounds, or combinations of these. Stream 514 may flow generally downward towards the bottom of the quench tower 528. Stream 514 may collect in the bottom portion 690 of the quench tower 528 and/or may be passed out of the quench tower 528 through the liquid outlet 584.

Although the product processing section 500 is described herein as including the quench tower system 502, it is contemplated that the product processing section 500 may alternatively include a heat transfer apparatus (not shown) and/or a mass transfer device (not shown) that may be configured in series or integrated into a unitary device. For example, the product processing section 500 may include a heat exchanger as the heat transfer apparatus to reduce the temperature of the product stream 380 and a gas/liquid contactor positioned downstream of the heat exchanger as the mass transfer device to remove the catalyst fines from the product stream 380. Examples of heat exchangers may include, but are not limited to, shell and tube heat exchangers, plate and frame heat exchangers, other heat exchangers, or combinations thereof. In the heat exchanger of the product processing section 500, the product quench fluid 510 may be thermally contacted with the product stream 380 by way of heat transfer surfaces in the heat exchanger, but may remain physically separated by the heat transfer surfaces. Examples of gas/fluid contactors may include, but are not limited to, particulate scrubbers or other gas/fluid contactors.

Continuously recycling the riser quench fluid 386 through the downstream reactor section 230, catalyst separation section 210, and product processing section 500 may result in the gradual buildup of contaminants in the recycled riser quench fluid 386. Additionally recycling the riser quench fluid 386 may result in pH changes in the riser quench fluid 386 over time. In some embodiments, water may be used for the riser quench fluid 386 and the product quench fluid 510. In these embodiments, the product processing section 500 may optionally include a stripper (not shown) to remove contaminants from the water circulated through the reaction system 102 as the riser quench fluid 386. In other embodiments, the product processing section 500 may also optionally include a system for adjusting the pH of the riser quench fluid 386 recirculated through the reactor system 102 and product processing section 500.

Figure 3:
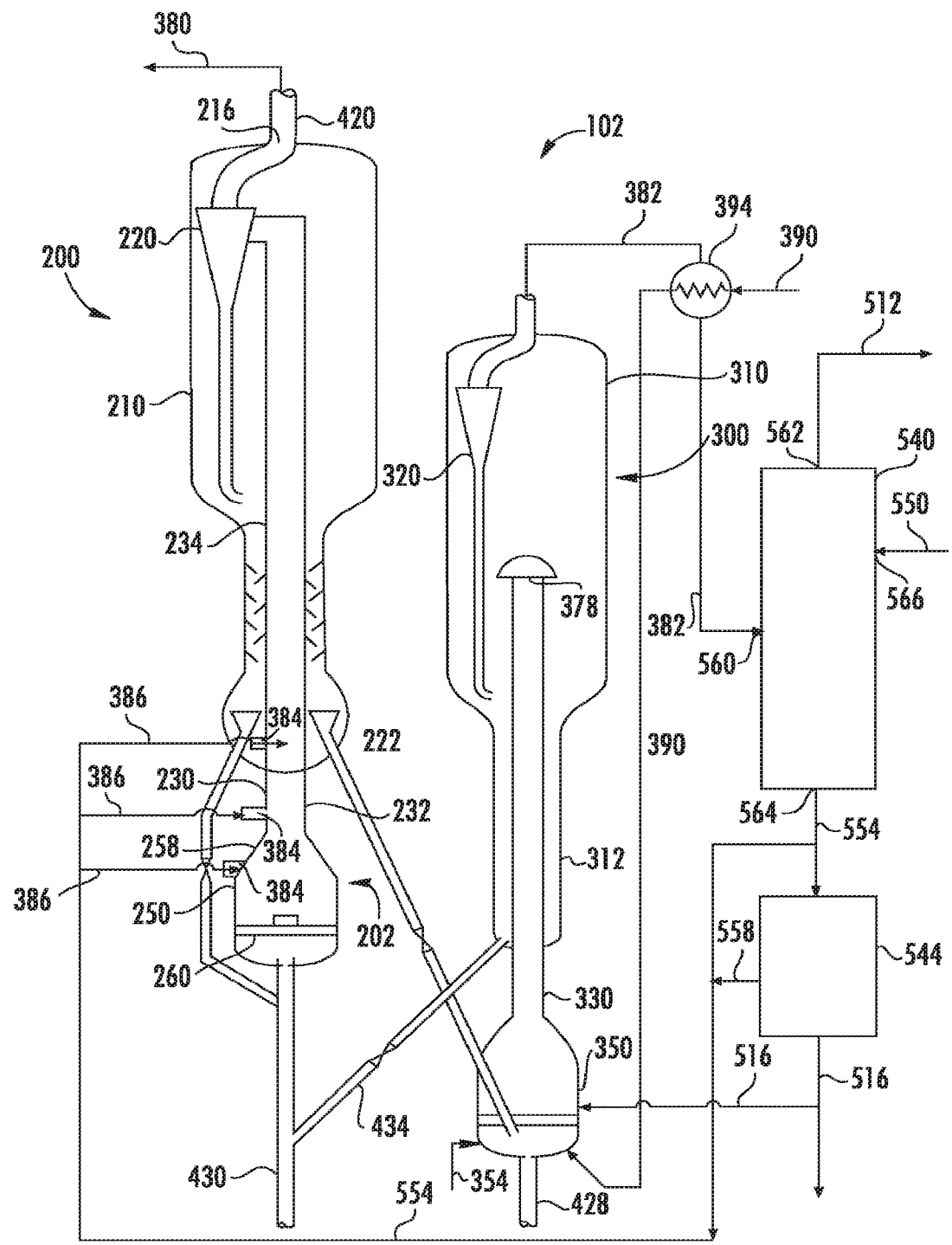
FIG. 3 schematically depicts another embodiment of a reactor system, according to one or more embodiments described herein.

Referring now to FIG. 3, the combustion gases 382 from the catalyst processing portion 300 of the reactor system 102 may also be further processed in a combustion gas processing section 540. The combustion gas 382 may be processed by thermally contacting the combustion gas 382 with a combustion gas quench fluid 550 in the combustion gas processing section 540. The combustion gas quench fluid 550 may be passed from the combustion gas processing section 540 back to the reactor 202 (i.e., the downstream reactor section 230, the upstream reactor section 250, and/or the transition section 258) as a portion of the riser quench fluid 386 to cool the intermediate product stream and the catalyst in the reactor 202.

The combustion gas 382 may be passed from the secondary separation device 320 of the catalyst processing portion 300 to a combustion gas processing section 540 positioned downstream of the secondary separation device 320. In some embodiments, the combustion gas 382 may pass through an optional combustion gas heat exchanger 394 disposed between the secondary separation device 320 and the gas processing section 540. The combustion gas heat exchanger 394 may be operable to heat the feed stream 390 by heat transfer from the combustion gas 382 to the feed stream 390. The combustion gas processing section 540 may be operable to reduce the temperature of the combustion gas 382. Additionally, the combustion gas processing section 540 may be operable to remove catalyst fines from the combustion gas 382 that were not separated from the combustion gas 382 in the secondary separation device 320. Any riser quench fluid 386 passed through the catalyst processing portion 300 of the reactor system 102 with the catalyst may also be separated from the combustion gas 382 in the combustion gas processing section 540. In the combustion gas processing section 540, a combustion gas quench fluid 550 may be introduced to the combustion gas processing section 540 to reduce the temperature of the combustion gas 382 and/or remove entrained solids, such as catalyst fines, from the combustion gas 382. The combustion gas quench fluid 550 may be passed out of the combustion gas processing section 540 as stream 554.

Stream 554 may include the combustion gas quench fluid 550. Additionally, stream 554 may include solid particles, such as catalyst fines for example, which may be transferred from the combustion gas 382 to the product quench fluid 510, and subsequently to stream 554, in the combustion gas processing section 540. Stream 554 may be passed back to the reactor 202 as at least a portion of the riser quench fluid 386. Passing stream 554 from the combustion gas processing section 540 back to the reactor 202 as the riser quench fluid 386 may reduce the quantity of combustion gas processing fluid 554 that, in some embodiments, must be treated in treatment systems or downstream processing before reuse or disposition of stream 554. Passing stream 554 back to the reactor 202 as the riser quench fluid 386 may also improve the conversion and selectivity of the reactor system 102 by returning catalyst fines to the reactor system 102.

Still referring to FIG. 3, the combustion gas processing section 540 may include a combustion gas inlet 560 in fluid communication with the secondary separation device 320. In embodiments in which the combustion gas heat exchanger 394 is disposed between the secondary separation device 320 and the combustion gas processing section 540, fluid communication between the secondary separation device 320 and the combustion gas inlet 560 may include fluid communication through the combustion gas heat exchanger 394. The combustion gas processing section 540 may also include a processed combustion gas outlet 562 operable to pass a processed combustion gas stream 552 out of the combustion gas processing section 540. The combustion gas processing section 540 may also include a combustion gas quench fluid inlet 566 positioned to introduce the combustion gas quench fluid 550 to the combustion gas processing section 540. The combustion gas processing section 540 may further include a combustion gas quench fluid outlet 564 fluidly coupled to the riser quench fluid inlet 384 of the reactor 202 at the downstream reactor section 130, upstream reactor section 250, and/or the transition section 258 to pass stream 554 back to the downstream reactor section 230, upstream reactor section 250, and/or the transition section 258 as at least a portion of the riser quench fluid 386.

The combustion gas quench fluid 550 introduced to the combustion gas processing section 540 may include steam, liquid water, liquid hydrocarbon (e.g., a quench oil, fuel oil, or other hydrocarbon), or combinations of these. The liquid hydrocarbon may include hydrocarbons having greater than or equal to 6 carbon atoms, such as from 6 carbon atoms to 25 carbon atoms, or from 6 carbon atoms to 20 carbon atoms. In some embodiments, the combustion gas quench fluid 550 may include water. Alternatively, in other embodiments, the combustion gas quench fluid 550 may include liquid hydrocarbon, such as quench oil or fuel oil for example. In some embodiments, the combustion gas quench fluid 550 may be the same as the riser quench fluid 386 introduced to the reactor 202. In other embodiments, the combustion gas quench fluid 550 may be the same as the riser quench fluid 386 and the product quench fluid 510 introduced to the product quench tower 502.

Referring to FIG. 3, in operation of the combustion gas processing section 540, the combustion gas 382 may be passed from the secondary separation device 320, through the optional combustion gas heat exchanger 394, and to the combustion gas processing section 540. The combustion gas 382 may be thermally and/or physically contacted with the combustion gas quench fluid 550 in the combustion gas processing section 540. Thermally contacting the combustion gas 382 with the combustion gas quench fluid 550 in the combustion gas processing section 540 may reduce the temperature of the combustion gas 382. In some embodiments, a temperature of the processed combustion gas 552 passed out of the combustion gas processing section 540 may be less than a temperature of the combustion gas 382 introduced to the combustion gas processing section 540 by from 50° C. to 500° C., from 50° C. to 400° C., from 50° C. to 300° C., from 50° to 200° C., from 100° C. to 500° C., from 100° C. to 400° C., from 100° C. to 300° C., or from 100° C. to 200° C.

Physically contacting the combustion gas 382 with the combustion gas quench fluid 550 in the combustion gas processing section 540 may remove particulate solids from the combustion gas 382. In some embodiments, the processed combustion gas 552 may be substantially free of particulate solids, such as catalyst fines. For example, the processed combustion gas 552 passed out of the combustion gas processing section 540 may have less than 0.1 wt. % particulates based on the total weight of the processed combustion gas 552.

Thermally and/or physically contacting the combustion gas quench fluid 550 with the combustion gas 382 in the combustion gas processing section 540 may produce stream 554. Stream 554 may include the combustion gas quench fluid 550 introduced to the combustion gas quench tower 542, catalyst fines and other particulates recovered from the combustion gas 382, other compounds, and/or combinations of these. Stream 554 may have a temperature greater than the temperature of the combustion gas quench fluid 550 introduced to the combustion gas quench tower 542 but less than a temperature of the intermediate product stream and catalyst in the reactor 202. Stream 554 may be passed out of the combustion gas processing section 540 through the combustion gas quench fluid outlet 564.

In some embodiments, the combustion gas processing section 540 may include a combustion gas quench tower system (not shown). The combustion gas quench tower system may include any of the features previously described herein in relation to the quench tower system 502 illustrated in FIG. 2 and previously described herein. For example, the combustion gas quench tower system may include the quench tower 528, which may include the nozzles 530, the demister 532, the chimney tray 536, and and/or the gas/liquid contactor 534, as illustrated in FIG. 2. The combustion gas quench tower system may also include one or more of the contacting loop 610 that includes the Venturi contactor 612 and the contactor pump 614; the quench fluid recycle loop 620 that includes a quench fluid heat exchanger 622 and a quench fluid recycle pump 624; and/or a gas processing loop 630 that includes the compressor 632, gas processing heat exchanger 634, and the knock-out vessel 636. In some embodiments, the gas inlet to the Venturi contactor 612 (FIG. 2) may be the combustion gas inlet 560 (FIG. 3) of the combustion gas processing section 540. In some embodiments, the gas outlet of the knock-out vessel 636 (FIG. 2) of the gas processing loop 630 (FIG. 2) may be the combustion gas outlet 562 (FIG. 3) of the combustion gas processing section 540. Alternatively, in other embodiments, the gas outlet of the quench tower 528 (FIG. 2) may be the combustion gas outlet 562 (FIG. 3) of the combustion gas processing section 540. In some embodiments, the liquid outlet 584 (FIG. 2) of the quench tower 528 (FIG. 2) may be the combustion gas quench fluid outlet 564 (FIG. 3) of the combustion gas processing section 540.

Although described herein as having the combustion gas quench tower system, it is contemplated that the combustion gas processing section 540 may alternatively include a heat transfer device (not shown) and a mass transfer device (not shown) that may be configured in series or integrated into a unitary device. For example, the combustion gas processing section 540 may include a heat exchanger to reduce the temperature of the combustion gas 382 and a scrubber positioned downstream of the heat exchanger to remove the catalyst fines from the combustion gas 382. In the heat exchanger of the combustion gas processing section 540, the combustion gas quench fluid 550 may be thermally contacted with the combustion gas 382 by way of heat transfer surfaces in the heat exchanger, but may remain physically separated by the heat transfer surfaces.

Referring to FIG. 3, stream 554 may be passed from the combustion gas processing section 540 to the riser quench fluid inlet 384 as the riser quench fluid 386 and introduced to the reactor 202 to cool the intermediate product stream and catalyst in the reactor 202. Passing stream 554 to the riser quench fluid inlet 384 to introduce stream 554 into the reactor 202 as the riser quench fluid 386 may, in some embodiments, reduce the amount of fluids conveyed to downstream processing and/or treatment systems, such as water treatment systems in the case of water as the quench fluid or downstream chemical processing systems in the case of hydrocarbon-based quench fluids. Additionally, catalyst fines transferred from the combustion gas 382 to stream 554 in the combustion gas processing section 540 may be reintroduced to the reactor system 102 by passing stream 554 to the reactor 202 as the riser quench fluid 386. Re-introduction of catalyst fines to the reactor system 102 may improve conversion and product selectivity of the reactor system 102.

Referring to FIG. 3, in some embodiments, the reaction system 102 may include a combustion gas solids concentrator 544, and stream 554 may be passed from the combustion gas processing section 540 to the combustion gas solids concentrator 544. The combustion gas solids concentrator 544 may separate the catalyst particles from stream 554 downstream of the combustion gas processing section to produce catalyst fines 516 and stream 558. Stream 558 may be substantially free of catalyst particles upon passing out of the combustion gas solids concentrator 544. The combustion gas solids concentrator 544 may include at least one of a liquid candle filter, a bag filter, a filter press, other solids concentrator, or combinations of these. In some embodiments, the combustion gas solids concentrator 544 may include at least one liquid candle filter.

As shown in FIG. 3, stream 558 may be passed from the combustion gas solids concentrator 544 to the reactor 202 as at least a portion of the riser quench fluid 386 to cool the intermediate product stream and the catalyst in the reactor 202. The catalyst fines 516 may be passed from the combustion gas solids concentrator 544 back to the reactor system 102. For example, the catalyst fines 516 may be passed to the catalyst processing portion 300 or the upstream reactor section 250 of the reactor system 102. In some embodiments, the catalyst fines 516 may be passed to the combustor 350 or section 312 of the catalyst processing portion 300, where the catalyst fines 516 may be processed in catalyst processing portion 300 before being passed back to the upstream reactor section 250. As previously discussed, the catalyst fines 516 from the combustion gas solids concentrator 544 may include catalyst fines having a smaller average particle size relative to the average particle size of the catalyst in the reactor system 102. Recovering the catalyst fines 516 from stream 554 and passing the catalyst fines 516 back into the reactor system 102 may improve the conversion and selectivity of the reactor system 102 due to the additional catalyst loading on the catalyst fines that comprise the catalyst fines 516.

Figure 4:
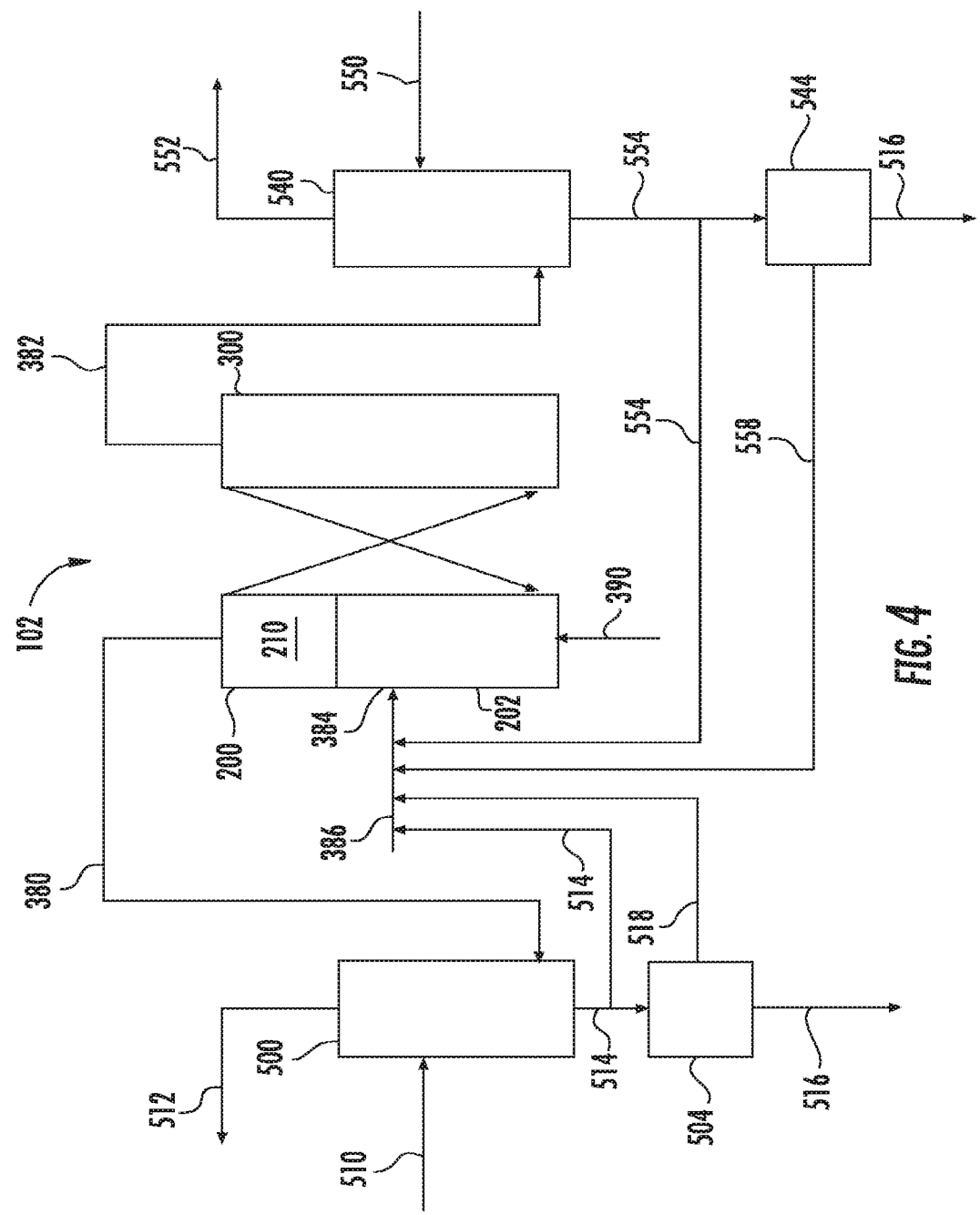
FIG. 4 schematically depicts a reactor system flow chart, according to one or more embodiments described herein.

Referring to FIG. 4, the reactor system 102 that includes both the product processing section 500 for processing the product stream 380 and the combustion gas processing section 540 for processing the combustion gas 382 is schematically depicted. As shown in FIG. 4, the riser quench fluid 386 may include stream 514 passed out of the product processing section 500, stream 554 passed out of the combustion gas processing section 540, or both stream 514 and stream 554. In embodiments, stream 514 and stream 554 may be combined to form the riser quench fluid 386 upstream of the riser quench fluid inlet 384, through which the riser quench fluid 386 is introduced to the reactor 202 (i.e., the downstream reactor section 230 (FIG. 1), the upstream reactor section 250 (FIG. 1), and/or the transition section 258 (FIG. 1)). Alternatively, in some embodiments, stream 514 may be passed to and through the product-side solids concentrator 504 to form stream 518 and the catalyst fines 516, and stream 554 may be passed to and through the combustion gas solids concentrator 544 to form stream 558 and the catalyst fines 516. In these embodiments, the riser quench fluid 386 may include stream 518 passed out of the product-side solids concentrator 504, stream 558 passed out of the combustion gas solids concentrator 544, or both. Stream 518 and stream 558 may be combined to form the riser quench fluid 386 upstream of the riser quench fluid inlet 384.

Figure 5:
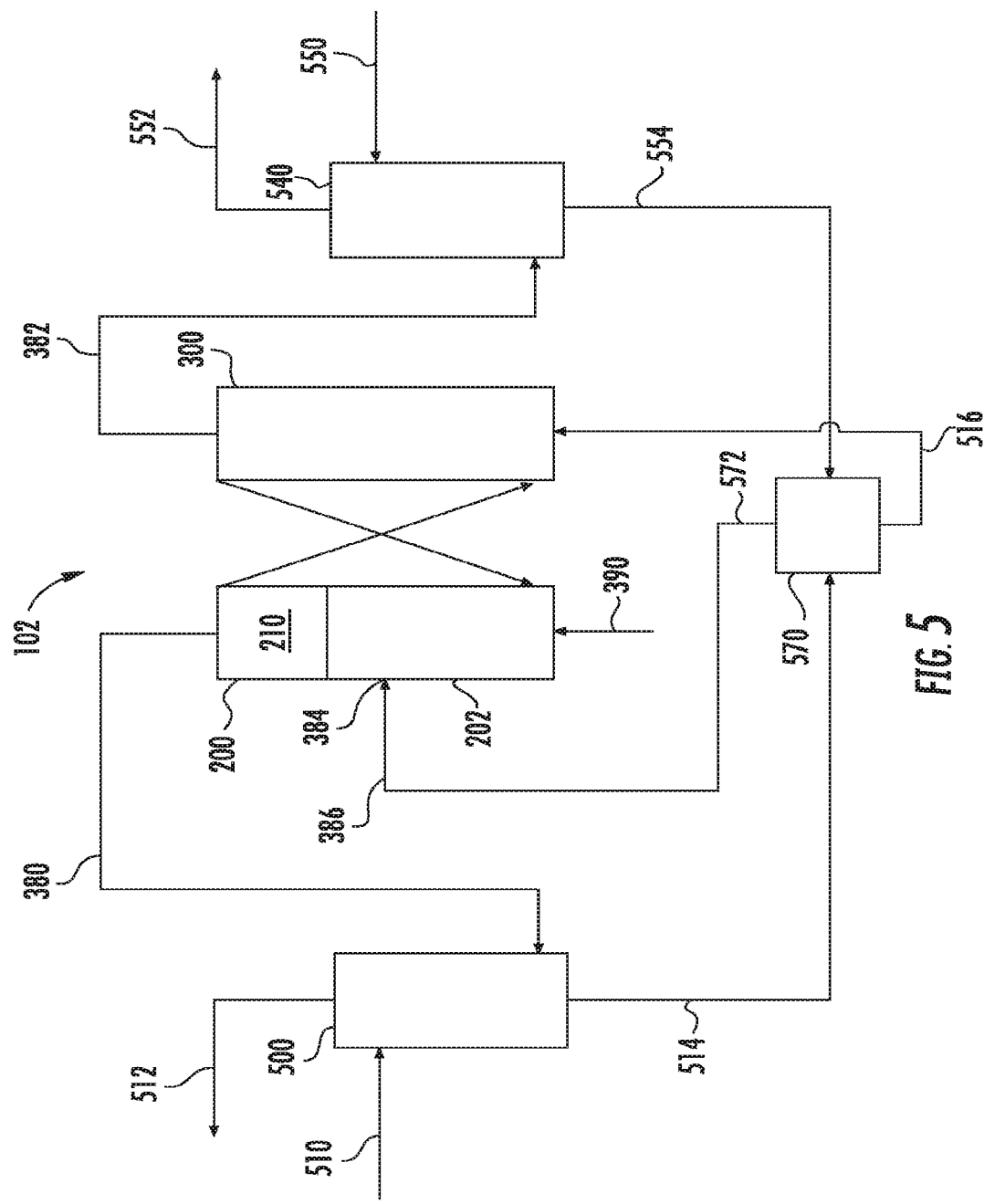
FIG. 5 schematically depicts another reactor system flow chart, according to one or more embodiments described herein.

Referring now to FIG. 5, another configuration of the reactor system 102 that includes both the product processing section 500 and the combustion gas processing section 540 is schematically depicted. As shown in FIG. 5, stream 514 passed out of the product processing section 500 and stream 554 passed out of the combustion gas processing section 540 may be passed to a common solids concentrator 570 to produce stream 572 and the catalyst fines 516. The common solids concentrator 570 may include at least one of a liquid candle filter, a bag filter, a filter press, other solids concentrator, or combinations of these. In some embodiments, the common solids concentrator 570 may include at least one liquid candle filter. Stream 572 may be passed from the common solids concentrator 570 to the riser quench fluid inlet 384 as at least a portion of the riser quench fluid 386 that is introduced to the reactor 202 to cool the intermediate product stream and the catalyst. The catalyst fines 516 may be passed from the common solids concentrator 570 back to the reactor system 102. For example, the catalyst fines 516 may be passed back to the catalyst processing portion 300 of the reactor system 102, the upstream reactor section 250, or both. Passing both stream 514 and stream 554 to the common solids concentrator 570 may reduce the number of solid concentrators from two solid concentrators (i.e., the product-side solids concentrator 504 and the combustion gas solids concentrator 544) to only one solid concentrator (i.e., common solids concentrator 570).

According to one or more embodiments, the reaction conducted in the reaction system 102 may be a dehydrogenation reaction. According to such embodiments, the feed stream may comprise one or more of ethane, propane, n-butane, and i-butane. For example, if the reaction is a dehydrogenation reaction, then the feed stream may comprise one or more of ethane, propane, n-butane, and i-butane. In some embodiments, the feed stream may comprise at least 50 wt. %, ethane. In other embodiments, the feed stream may comprise at least 50 wt. % propane. In still other embodiments, the feed stream may comprise at least 50 wt. % n-butane. In additional embodiments, the feed stream may comprise at least 50 wt. % i-butane.

In one or more embodiments, a dehydrogenation reaction may utilize gallium and/or platinum catalyst as a catalyst. In such embodiments, the catalyst may comprise a gallium and/or platinum catalyst. For example, if the reaction is a dehydrogenation reaction, then the catalyst may comprise gallium and/or platinum catalyst. As described herein, a gallium and/or platinum catalyst comprises gallium, platinum, or both. The gallium and/or platinum catalyst may be carried by an alumina or alumina silica support, and may optionally comprise potassium. Such gallium and/or platinum catalysts are disclosed in U.S. Pat. No. 8,669,406, which is incorporated herein by reference in its entirety. However, it should be understood that other suitable catalysts may be utilized to perform the dehydrogenation reaction.

The reaction may also be a cracking reaction, a dehydration reaction, a methanol-to-olefin reaction, or other reaction. Further details of cracking reactions, dehydration reactions, and methanol-to-olefin reactions may be found in co-pending U.S. Provisional Patent Application Ser. No. 62/470,567, filed on Mar. 13, 2017, which is incorporated by reference herein in its entirety.

For the purposes of describing and defining the present invention it is noted that the term "about" is utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

Generally, "inlet ports" and "outlet ports" of any system unit of the reactor system 102 described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit of the reactor system 102 to which a pipe, conduit, tube, hose, material transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method for processing a chemical stream, the method comprising:
    contacting a feed stream with a catalyst in a reactor system, wherein the contacting of the feed stream with the catalyst causes a reaction which forms a product stream;
    separating at least a portion of the catalyst from the product stream in a catalyst separation section downstream of the reactor;
    after separating at least a portion of the catalyst from the product stream, passing at least a portion of the product stream to a product processing section;
    introducing a product quench fluid to the product processing section, where the product quench fluid cools the at least a portion of the product stream in the product processing section and removes catalyst fines from the at least a portion of the product stream to produce a processed product stream and a quench fluid stream, wherein the quench fluid stream comprises the product quench fluid and the catalyst fines;
    concentrating the catalyst fines from the product quench fluid; and
    passing the catalyst fines back to the reactor system.

2. The method of claim 1, wherein the product processing section comprises a quench tower.

3. The method of claim 1, wherein the product quench fluid comprises steam, liquid water, liquid hydrocarbon, or combinations of these.

4. The method of claim 1, comprising passing the catalyst fines to a catalyst processing portion or an upstream reactor section of the reactor system.

5. The method of claim 4, further comprising:
    passing the catalyst fines to the catalyst processing portion of the reactor system; and
    processing the catalyst fines in the catalyst processing portion before passing the catalyst fines back to the reactor.

6. The method of claim 1, wherein concentrating the catalyst fines from the product quench fluid comprises passing the product quench fluid to a product-side solids concentrator.

7. The method of claim 6, wherein the product-side solids concentrator comprises a liquid candle filter, a bag filter, a filter press, or a combination of these.

8. The method of claim 1, wherein concentrating the catalyst fines from the product quench fluid produces the catalyst fines and a stream comprising the product quench fluid and less than 0.1 wt. % catalyst particles based on the total weight of the stream.

9. The method of claim 1, further comprising passing a processed product stream out of the product processing section, wherein the processed product stream is substantially free of particulate solids.

10. The method of claim 1, further comprising introducing a riser quench fluid into a downstream reactor section, an upstream reactor section, or a transition section between the downstream reactor section and the upstream reactor section and into contact with the at least a portion of an intermediate product stream and the catalyst in the downstream reactor section, the upstream reactor section, or the transition section to slow or stop the reaction of the intermediate product stream with the catalyst to form the product stream, the riser quench fluid having a temperature less than a temperature of the intermediate product stream.

11. The method of claim 1, further comprising:
after separating at least a portion of the catalyst from the product stream, passing at least a portion of the catalyst to a catalyst processing portion of the reactor system;
processing the at least a portion of the catalyst in the catalyst processing portion, wherein processing the catalyst forms a combustion gas and a processed catalyst;
passing at least a portion of the processed catalyst from the catalyst processing portion back to the reactor;
passing the combustion gas to a combustion gas processing section;
thermally contacting the combustion gas with a combustion gas quench fluid in the combustion gas processing section, where the combustion gas quench fluid cools at least a portion of the combustion gas in the combustion gas processing section and separates catalyst fines from the at least a portion of the combustion gas to produce a processed combustion gas stream and a combustion gas quench effluent, wherein the combustion gas quench effluent stream comprises the combustion gas quench fluid and the catalyst fines;
concentrating the catalyst fines from the combustion gas quench effluent; and
passing the catalyst fines back to the reactor system.

12. The method of claim 11, wherein the combustion gas processing section comprises a quench tower.

13. The method of claim 11, wherein concentrating the catalyst fines from the combustion gas quench effluent comprises passing the at least a portion of the combustion gas quench effluent to a combustion gas solids concentrator, wherein passing the combustion gas quench fluid through the combustion gas solids concentrator removes catalyst fines from the combustion gas quench fluid.

14. The method of claim 11, wherein the combustion gas quench fluid comprises water, hydrocarbon, or both.

15. The method of claim 11, further comprising passing a processed combustion gas out of the combustion gas processing section, wherein the processed combustion gas is substantially free of particulate solids.

16. A system for processing a chemical stream, the system comprising:
a reactor portion of a reactor system, the reactor portion comprising:
a reactor; and
a separation device operable to separate a catalyst from a product stream;
a catalyst processing portion comprising:
a combustor configured to receive catalyst from the separation device; and
a separation section downstream of the combustor and configured to separate the catalyst from a combustion gas;
a product processing section comprising a product stream inlet in fluid communication with the separation device, a quench fluid inlet operable to introduce a product quench fluid to the product processing section, a processed product stream outlet operable to pass a processed product stream out of the product processing section, and a quench fluid outlet;
wherein the product processing section is operable to:
reduce a temperature of the product stream; or
remove catalyst fines and other particulate solids from the product stream that were not separated from the product stream in the catalyst separation section.

17. The system of claim 16, further comprising:
a combustion gas processing section comprising a combustion gas inlet in fluid communication with the catalyst processing portion of the reactor, a combustion gas quench fluid inlet operable to introduce a combustion gas quench fluid to the combustion gas processing section, a processed combustion gas outlet operable to pass a processed combustion gas stream out of the combustion gas processing section, and a combustion gas quench fluid outlet; and
wherein the combustion gas processing section is operable to:
reduce a temperature of the combustion gas; and
pass at least a portion of the combustion gas quench fluid out of the combustion gas processing section.

18. The system of claim 16, wherein the product processing section comprises a quench tower and a product-side solids concentrator downstream of the quench tower, the product side-solids concentrator operable to separate the catalyst fines from a product quench fluid from the quench tower.

19. The system of claim 17, wherein the combustion gas processing section comprises a quench tower and a combustion gas solids concentrator downstream of the quench tower, the combustion gas solids concentrator operable to separate catalyst fines from a combustion gas quench fluid from the quench tower.

* * * * *